(12) United States Patent
Karlsson

(10) Patent No.: US 10,637,131 B2
(45) Date of Patent: Apr. 28, 2020

(54) VEHICLE COMPRISING A REAR VIEW MIRROR AND AN ANTENNA

(71) Applicants: VOLVO TRUCK CORPORATION, Göteborg (SE); KAPSCH TRAFFIC-COM AB, Jönköping (SE)

(72) Inventor: Kristian Karlsson, Sandhult (SE)

(73) Assignees: VOLVO TRUCK CORPORATION, Göteborg (SE); KAPSCH TRAFFIC-COM AB, Jönköping (SE)

( * ) Notice: Subject to any disclaimer, the term of this patent is extended or adjusted under 35 U.S.C. 154(b) by 18 days.

(21) Appl. No.: 15/759,729

(22) PCT Filed: Sep. 14, 2015

(86) PCT No.: PCT/EP2015/070923
§ 371 (c)(1),
(2) Date: Mar. 13, 2018

(87) PCT Pub. No.: WO2017/045693
PCT Pub. Date: Mar. 23, 2017

(65) Prior Publication Data
US 2018/0254548 A1    Sep. 6, 2018

(51) Int. Cl.
| | | |
|---|---|---|
| *H01Q 19/10* | (2006.01) | |
| *H01Q 1/32* | (2006.01) | |
| *B60R 1/12* | (2006.01) | |
| *B60R 1/06* | (2006.01) | |

(52) U.S. Cl.
CPC ............ *H01Q 1/3266* (2013.01); *B60R 1/06* (2013.01); *B60R 1/12* (2013.01); *H01Q 1/3283* (2013.01); *H01Q 19/10* (2013.01); *B60R 2001/1261* (2013.01); *B60R 2001/1276* (2013.01)

(58) Field of Classification Search
CPC .... H01Q 1/3266; H01Q 19/10; H01Q 1/3283; H01Q 1/32; B60R 1/06; B60R 1/12; B60R 2001/1276; B60R 2001/1261
USPC ........................................................ 343/711
See application file for complete search history.

(56) References Cited

U.S. PATENT DOCUMENTS

| | | | | |
|---|---|---|---|---|
| 4,210,357 A | * | 7/1980 | Adachi ..................... | B60R 1/12 342/70 |
| 6,697,024 B2 | * | 2/2004 | Fuerst ................ | B60C 23/0444 343/711 |

FOREIGN PATENT DOCUMENTS

| | | |
|---|---|---|
| JP | 54-45040 A | 4/1979 |
| JP | 2004-013413 A | 1/2004 |
| JP | 2005043102 A | 2/2005 |
| JP | 2010-200160 A | 9/2010 |

(Continued)

OTHER PUBLICATIONS

International Search Report and Written Opinion corresponding to PCT/EP2015/070923, dated Oct. 22, 2015.

(Continued)

*Primary Examiner* — Hai V Tran
(74) *Attorney, Agent, or Firm* — Kilpatrick Townsend & Stockton LLP

(57) ABSTRACT

The invention relates to a vehicle comprising a rear view mirror presenting reflective surface arranged to provide a driver of the vehicle with a view in a rearward direction of the vehicle, and an antenna adapted to emit radiation for radio wave transmissions, wherein the antenna and the rear view mirror are arranged so that at least a part of the radiation emitted by the antenna is reflected by the reflective surface.

37 Claims, 7 Drawing Sheets

(56) References Cited

FOREIGN PATENT DOCUMENTS

| | | |
|---|---|---|
| JP | 2014-017747 A | 1/2014 |
| JP | 2015-113643 A | 6/2015 |
| WO | WO2012/084844 A2 | 6/2012 |

OTHER PUBLICATIONS

Office action dated Apr. 30, 2019 in Japanese Patent Application No. 2018-510855, all pages. No English translation available.
Notice of Reasons for Refusal drafted Dec. 12, 2019 for Japanese Patent Application No. 2018-510855, 6 pages.

* cited by examiner

VEHICLE COMPRISING A REAR VIEW MIRROR AND AN ANTENNA

TECHNICAL FIELD

The invention relates to a vehicle comprising a rear view mirror presenting a reflective surface arranged to provide a driver of the vehicle with a view in a rearward direction of the vehicle, and an antenna adapted to emit radiation for radio wave transmissions. The invention also relates to a use of an antenna adapted to emit radiation for radio wave transmissions and a rear view mirror of a vehicle, presenting a reflective surface arranged to provide a driver of the vehicle with a view in a rearward direction of the vehicle.

The invention can be applied in heavy-duty vehicles, such as trucks, buses and construction equipment, and also in light vehicles such as cars or motorcycles.

BACKGROUND

To enhance transport safety and efficiency, systems involving vehicle-to-vehicle communications, vehicle-to-infrastructure communications and/or infrastructure-to-vehicle communications, e.g. according to the standard ITS-G5, are becoming increasingly popular. In such systems, it is important that the communications are reliable, and that their implementation is cost effective.

Standards for such communications systems, such as said ITS-G5, often use relatively high carrier frequencies, e.g. around 5.9 GHz for ITS-G5. This means that the antenna placement has a significant impact on the quality of the transmission. Heavy vehicles are particularly challenging from this point of view, due to their shapes and dimensions, and finding a location for an antenna for the system, which provides a good transmission quality in a variety of situations, may be very difficult. Signals are especially blocked backwards as a trailer may obscure the line of sight. Blocked signals lead to lost information, which in turn leads to delays and increased uncertainty in applications of systems of said kind.

WO2012/084844 discloses a vehicle antenna system, e.g. for vehicle-to vehicle communication, with antennas placed in the external mirrors of the vehicle. However, this is a solution which is expensive to implement, since it adds complexity to the rear view mirrors, including antennas, adapters and RF cables. In addition, rear view mirrors are a vulnerable part of a vehicle, which may easily be damaged and need replacement. The inclusion of communications hardware in the rear view mirrors will thus increase costs both at vehicle production, and maintenance.

U.S. Pat. No. 4,210,357 discloses a radar antenna reflector located in a frame for a rear view mirror, and spaced rearwards from the mirror. However, this solution also adds complexity and cost to the rear view mirror, adding the reflector which needs to be provided with a special structure which transmits light rays but reflects radar frequency waves.

SUMMARY

An object of the invention is to improve, in a cost effective manner, the reliability and quality of vehicle radio communications, in particular for vehicle-to-vehicle communications, vehicle-to-infrastructure communications and/or infrastructure-to-vehicle communications, involving relatively high carrier frequencies.

The object is achieved by a vehicle according to claim 1.

Thus, the invention provides a vehicle comprising a rear view mirror presenting a reflective surface arranged to provide a driver of the vehicle with a view in a rearward direction of the vehicle, and an antenna adapted to emit radiation for radio wave transmissions, wherein the antenna and the rear view mirror are arranged so that at least a part of the radiation emitted by the antenna is reflected by the reflective surface.

Advantageously, the antenna and the rear view mirror are arranged so that the radiation reflected by the reflective surface is at least partly directed in a rearward direction of the vehicle. More specifically, the reflected radiation may be directed so as to have a component of its direction in the rearward direction of the vehicle.

Arranging the antenna the antenna and the rear view mirror so that at least a part of the radiation emitted by the antenna is reflected by the reflective surface, provides a highly cost effective way to provide a reliable transmission in the rearwards direction of the vehicle. In particular on heavy vehicles, such as trucks or buses, this is very advantageous, since problems with rearwards obstructions due to vehicle shapes and dimensions can be addressed, while avoiding the need to add any cost increasing hardware, in particular in the rear view mirrors, which are susceptible to damage and often need replacement. No changes of the current design of rear view mirrors are needed.

It should be noted that the invention also provides for radiation from an antenna remote from the vehicle, e.g. in the surroundings, to be reflected by the reflective surface, and received by the antenna. This is particularly advantageous where the radio waves approach the vehicle from behind.

It should be noted that the invention may be embodied with a single antenna, or any suitable alternative number of antennas, such as two or more antennas, forming an antenna cluster, in which they are arranged to cooperate and to send and receive the same radio signal information. One or more of the antennas in such clusters may be arranged along with one or more rear view mirrors so that at least a part of the radiation emitted by the antenna(s) is reflected by the rear view mirror reflective surface(s), while the one or more remaining antennas are adapted to emit radiation without such reflection. Thereby, a particularly good coverage of the radiation in all directions of the vehicle may be provided.

Preferably, the rear view mirror is adjustable to change the angular position of the reflective surface, wherein the antenna and the rear view mirror are arranged so that, in any angular position of the reflective surface, the radiation reflected by the reflective surface is at least partly directed in a rearward direction of the vehicle. Thereby a high efficiency in the transmissions may be maintained without imposing restrictions on the use of the rear view mirror, e.g. by the driver or a passenger. The allowance of a variety of reflective surface angular positions may be accomplished for example by a suitable location of the antenna in relation to the reflective surface, e.g. as exemplified below. Also, the radio waves of the radiation, having a wavelength which is considerably longer than that of visible light, has a tendency to spread upon reflection, which assists in providing reflected radiation in the rearward direction of the vehicle, regardless of the angular position of the reflective surface.

The vehicle may comprise a transmitter which is connected to the antenna, and preferably the transmitter, the antenna and the rear view mirror are arranged so that the transmissions of the antenna are for vehicle-to-vehicle communications and/or vehicle-to-infrastructure communications. Also, a receiver might be connected to the antenna, for infrastructure-to-vehicle communications. Such communications will, due to their relatively high carrier frequencies, benefit particularly from the inventive solution. For example, the transmitter and the antenna may be arranged so that the transmissions of the antenna have a carrier frequency of 5.8-6.0 GHz, preferably 5.855-5.925 GHz; the latter range is used for the standard ITS 5G.

Preferably, the rear view mirror is mounted externally on the vehicle. The antenna may be mounted on a side of a cab or a body of the vehicle. The antenna may be mounted on an external side of a limitation of the vehicle. For example, the antenna may be mounted on a metal sheet of the cab, on the glass of a window, or on a window frame. An external location of the antenna will provide an unobstructed line of sight between the antenna and the reflective surface. This will secure a high reliability of the transmissions, the radiation of which is at least partly reflected on the reflective surface of the rear view mirror.

Preferably, the antenna is located within vertical limits above and below the reflective surface, which vertical limits are defined by respective vertical distances from a centre of the reflective surface, each vertical distance being equal to the vertical extension of the reflective surface. Thereby it is possible to provide an advantageous vertical location for the antenna for securing a backwards reflection of a substantial part of the antenna radiation. It should be noted that where the rear view mirror comprises two reflective surfaces, one for a far view and another for views on the nearby surrounding, preferably, the reflective surface for the far view should be regarded as the reflective surface, the centre of which is to be determined for the vertical limits of the antenna location.

Where the antenna is located within the limits of a vertical extension of the reflective surface, a particularly advantageous vertical location for the antenna, for securing the backwards reflection may, be provided.

Preferably, the antenna is located rearwards of a centre of the reflective surface and closer to a vehicle centre line than the centre of the reflective surface. Thereby it is possible to provide an advantageous horizontal location for the antenna for securing a backwards reflection of a substantial part of the antenna radiation.

The reflective surface may be located forward of the backrest of a driver's seat of the vehicle. The reflective surface may be located further away from a vehicle centre line than the backrest. Thereby, the antenna may be mounted in the vicinity of the line of sight between a driver of an average size and the reflective surface, which secures a high degree of rearwards reflection of the radiation of the antenna. The antenna is preferably located rearwards of a centre of the reflective surface, but the antenna is preferably located no further rearwards of the centre of the reflective surface than twice the distance, in a direction of straight travel of the vehicle, between the centre of the reflective surface and the backrest. Preferably, the distance between the antenna and the vehicle centre line is larger than the distance between the backrest and the vehicle centre line, but smaller than the distance between the centre of the reflective surface and the vehicle centre line.

It should be noted that in some embodiments, the antenna is mounted on a passenger side of the vehicle, rather than a driver's side of it. Thereby, the reflective surface may be that of a rear view mirror on the passenger side of the vehicle. Preferably, such an antenna is located within vertical limitations in relation to the passenger side rear view mirror similarly as described above. The antenna is preferably located rearwards of a centre of the reflective surface of the passenger side rear view mirror, but the antenna is preferably located no further rearwards that twice the distance, in a direction of straight travel of the vehicle, between the centre of the reflective surface and the backrest of the driver's seat. Preferably, the distance between the antenna and the vehicle centre line is smaller than the distance between the centre of the reflective surface of the passenger side rear view mirror and the vehicle centre line.

The antenna might be located further away from the vehicle centre line than the backrest. Thereby, the antenna might be mounted, as mentioned above, externally on the vehicle, providing an unobstructed line of sight between the antenna and the reflective surface.

Preferably, the antenna and the rear view mirror are arranged so that in a horizontal plane, the reflective surface extends over an antenna radiation sector of 10-40 degrees, preferably 20-30 degrees. Thereby, a substantial portion of the antenna radiation may be reflected by the reflective surface. In addition, vehicle movement will allow radiation to reach any areas which are temporarily somewhat "blinded" by rear view mirror.

Preferably, the antenna is arranged to present in a horizontal plane a non-zero directivity. The reflective surface may be located within an antenna radiation sector of 90 degrees which during transmission includes a radiation which is stronger than any radiation in an antenna radiation sector of the remaining 270 degrees. Thereby, the reflective surface will be located in a sector of maximum radiation. This will further secure that a substantial portion of the antenna radiation is reflected by the reflective surface. The antenna may be arranged so that during transmission the strongest radiation of the antenna is directed partly forward and partly sideways in relation to the vehicle. Thereby, a location of the antenna as described above in relation to the rear view mirror, may provide for a substantial portion of the radiation being reflected, while a further substantial portion of the radiation is directed forward and sideways in relation to the vehicle.

The antenna and the rear view mirror may be arranged so that a part of the antenna radiation is reflected by the reflective surface and another part of the antenna radiation is directed besides the reflective surface. Thereby, the antenna may provide for directing radiation in directions in addition to backwards in relation to the vehicle, via the reflective surface, such as forwards and sideways. Advantageously, the antenna has a beam width of approximately 180 degrees. This may allow radiation in other directions in addition to the direction of the reflective surface.

Various antenna types may be used for implementing the invention; the antenna may be for example a dipole antenna, or an omnidirectional antenna.

The antenna may be a first antenna, the vehicle comprising at least one additional antenna, the first antenna and the at least one additional antenna form together an antenna cluster, in which the first antenna and the at least one additional antenna are arranged to cooperate and to send and receive the same radio signal information. As also suggested above, one or more of the antennas in such a cluster may be arranged along with one or more rear view mirrors so that at least a part of the radiation emitted by the antenna(s) is reflected by the rear view mirror reflective surface(s), while the one or more remaining antennas are adapted to emit radiation without such reflection. Thereby, a particularly good coverage of the radiation in all directions of the vehicle may be provided.

Where the first antenna and the rear view mirror are arranged so that, during a transmission, the radiation reflected by the reflective surface is at least partly directed in a rearward direction of the vehicle, the vehicle may comprise a second antenna arranged to direct radiation of the transmission mainly in a forward direction of the vehicle.

The rear view mirror may be located on a driver's side of the vehicle, and the vehicle may comprise a further rear view mirror located on a passenger's side of the vehicle, the further rear view mirror presenting a further reflective surface arranged to provide the driver of the vehicle with a view in a rearward direction of the vehicle, the vehicle further comprising a further antenna for the radio wave transmissions, the further antenna being arranged so that at least a part of the radiation emitted by the further antenna is reflected by the further reflective surface. This will further increase the coverage of the radiation around the vehicle.

The object is also achieved by use of an antenna and a rear view mirror of a vehicle according to any one of claims 27-37.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
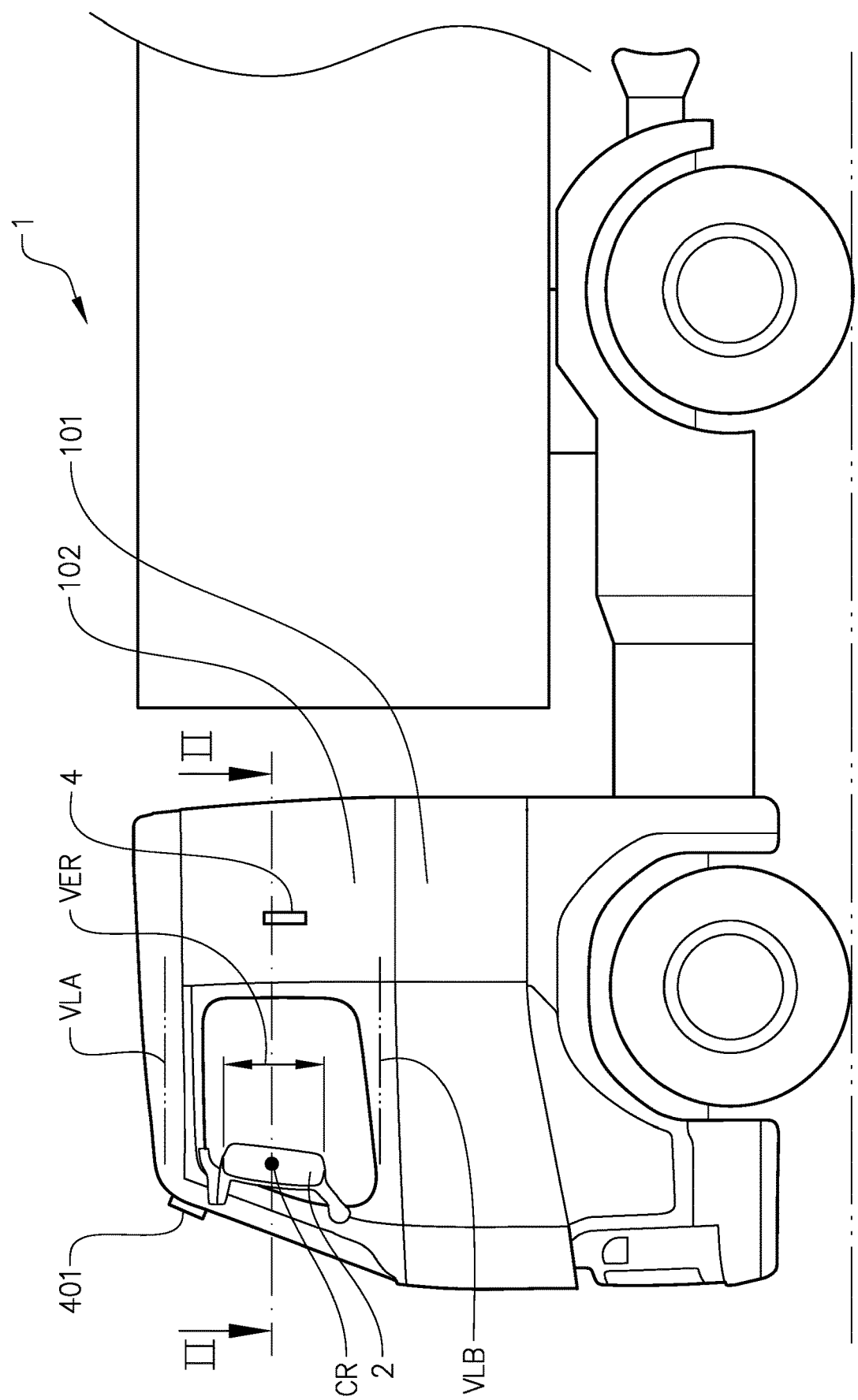
FIG. 1 is a side view of a vehicle according to an embodiment of the invention.

It is to be understood that the present invention is not limited to the embodiments described above and illustrated in the drawings; rather, the skilled person will recognize that many changes and modifications may be made within the scope of the appended claims.

FIG. 1 shows a vehicle 1 in the form of a truck, more specifically a tractor for a semitrailer. It should be noted though that the invention is applicable to any type of vehicle, such as a car, a bus or a lorry. The vehicle comprises a cab 101 with an interior compartment for a driver and a passenger.

Figure 2:
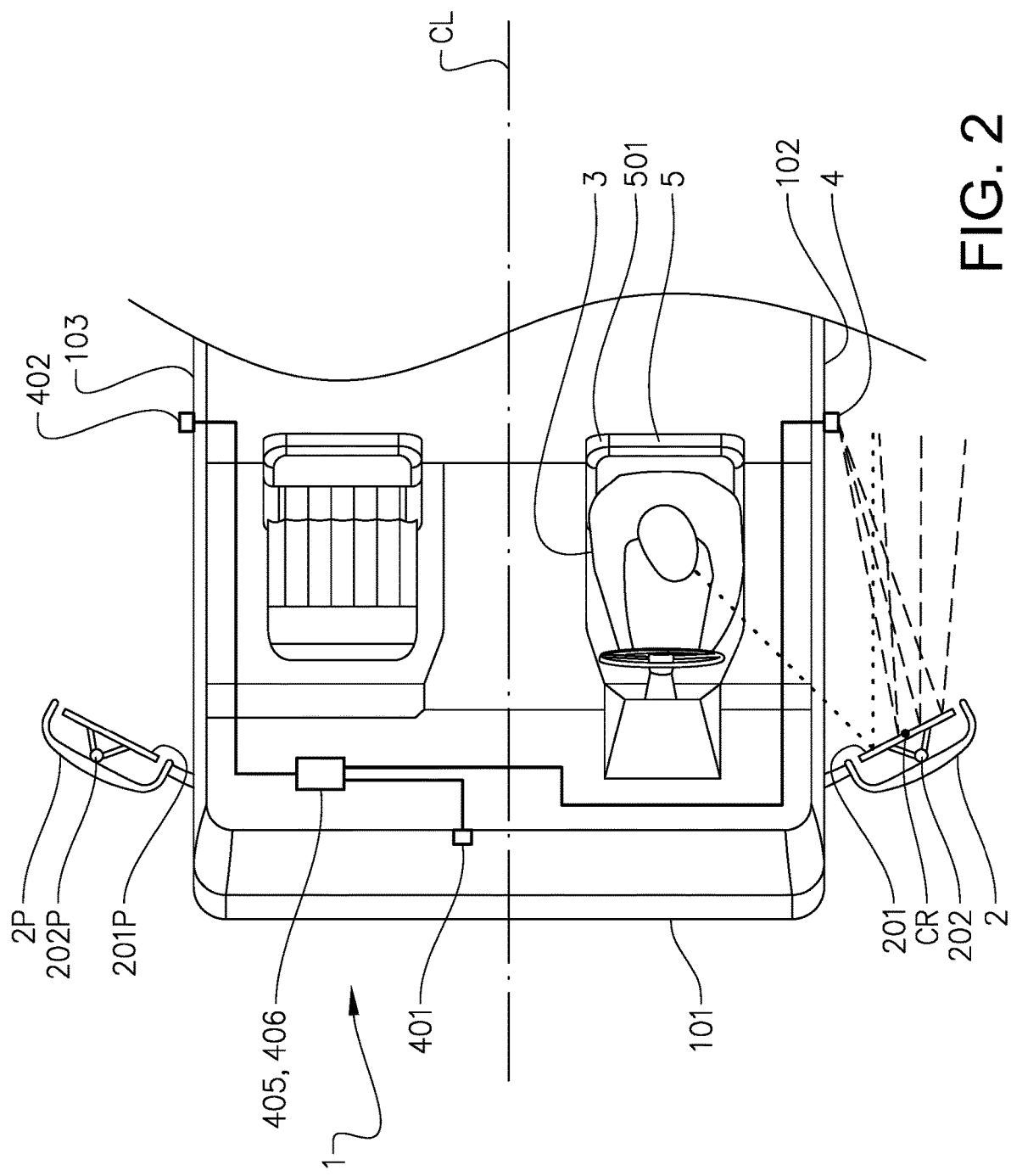
FIG. 2 is cross-sectional view, with the section oriented as indicated with the arrows II-II in FIG. 1, FIG. 3 and FIG. 4 show respective views, from opposite directions, of an antenna of the vehicle in FIG. 1.

Reference is also made to FIG. 2. The vehicle 1 comprises a first rear view mirror 2 located on a driver's side of the vehicle, and a second rear view mirror 2P, herein also referred to as a further rear view mirror, located on a passenger's side of the vehicle. The first and second rear view mirrors are mounted externally on the cab 101 and comprise respective reflective surfaces 201, 201P arranged to provide the driver 3 of the vehicle with a view in a rearward direction of the vehicle.

The vehicle 1 also comprises a first antenna 4, a second antenna 401, and a third antenna 402, herein also referred to as a further antenna, each adapted to emit radiation for radio wave transmissions. The first, second and third antennas 4, 401, 402 form together an antenna cluster, in which they are arranged to cooperate and to send and receive the same radio signal information. It should be noted that the invention may also be embodied with a single antenna, or any suitable alternative number of antennas, such as two, four or more antennas, forming an antenna cluster.

As can be seen on FIG. 2, the antennas 4, 401, 402 are mounted externally on the cab 101. The first antenna 4 is mounted on a driver's side 102 of the cab 101, and the third antenna 402 is mounted on a passenger's side 103 of the cab 101. The second antenna 401 is mounted on a forward side of the cab 101. Alternatively one or more of the antennas may be mounted inside the cab.

The vehicle comprises a transmitter 405 and a receiver 406 which are connected to the antennas 4, 401, 402. The transmitter 405, receiver 406 and the antennas 4, 401, 402 are arranged for vehicle-to-vehicle communications, vehicle-to-infrastructure communications, and infrastructure-to-vehicle communications. The transmitter 405, receiver 406 and the antennas 4, 401, 402 may further be arranged for a carrier frequency for the standard ITS-G5, i.e. 5.855-5.925 GHz. Of course, the transmitter 405, receiver 406 and the antennas 4, 401, 402 may alternatively be arranged for other types of radio communication, at other frequency bands.

Figure 3:
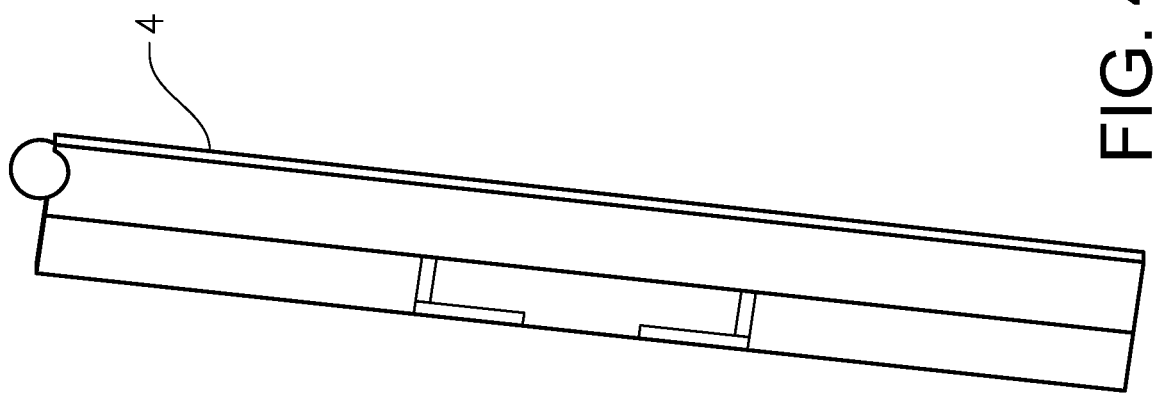
Figure 4:
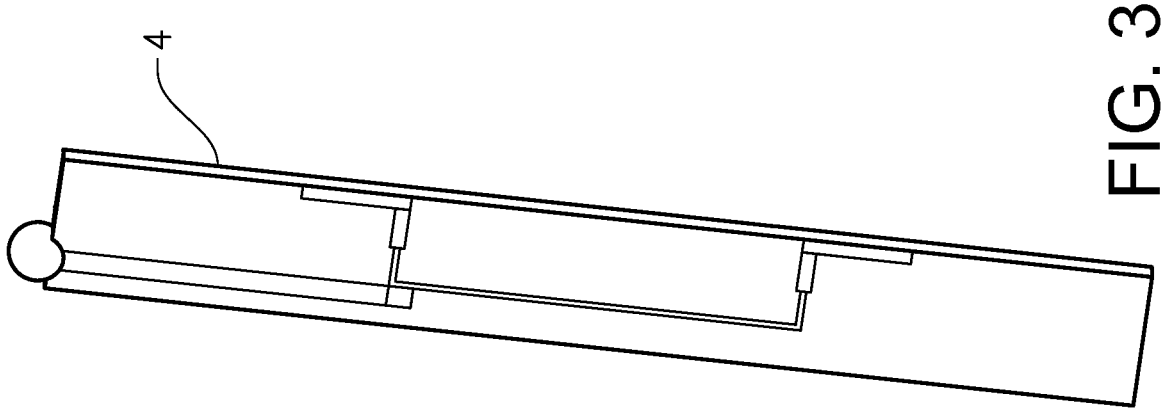

FIG. 3 and FIG. 4 show views the first antenna 4. In this example, the first, second and third antennas 4, 401, 402 are all the same. It is however possible to provide the antennas in the antenna cluster in mutually different antenna types.

The first antenna 4 is a dipole antenna with an elongated shape, comprising a printed circuit board (PCB). When mounted, the antenna is oriented to extend vertically. The length of the antenna may of course vary depending on the application. As an example, the length could be 60-100 mm.

Figure 5:
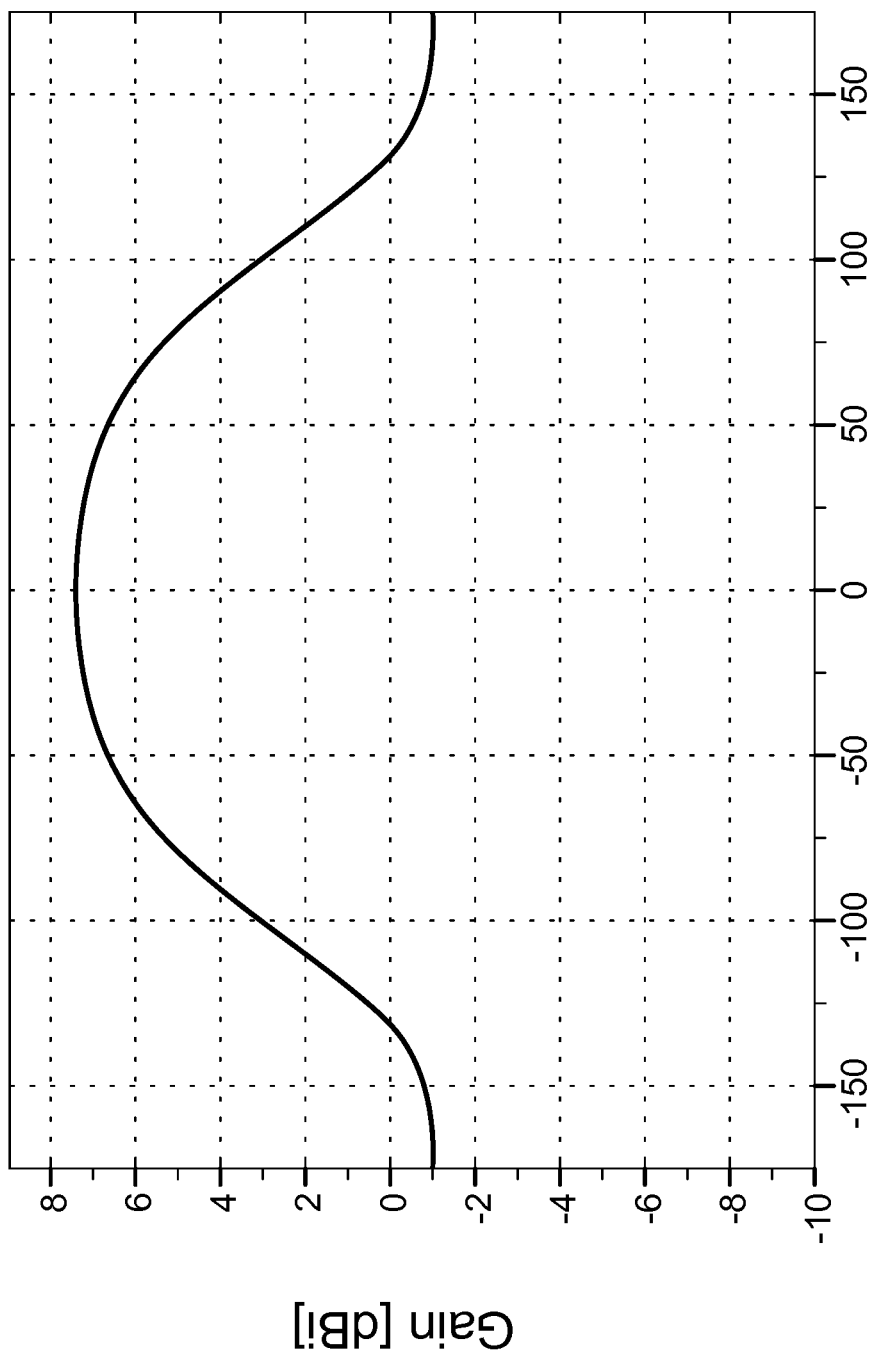
FIG. 5 is a diagram showing a radiation pattern of the antenna in FIG. 3 and FIG. 4.

Reference is made to FIG. 5, is a diagram showing a radiation pattern of the antenna in FIG. 3 and FIG. 4. The radiation pattern is expressed as the gain as a function of the angle in the azimuth plane, i.e. a plane which is perpendicular to the longitudinal direction of the antenna. In alternative embodiments, the antennas 4, 401, 402 may have a zero directivity, i.e. they may be omnidirectional antennas. In this embodiment, the antennas 4, 401, 402 have a non-zero directivity in a horizontal plane. More specifically, the antennas 4, 401, 402 in this example have respective beam widths of approximately 180 degrees. FIG. 5 shows how the radiation strength is reduced in both directions, roughly symmetrically from a point of maximum strength.

The second antenna 401 is arranged to direct radiation of transmissions mainly in a forward direction of the vehicle. The first and third antennas 4, 402 and the first and second rear view mirrors 2, 2P are arranged so that a part of the radiation emitted by the first and third antennas 4, 402 is reflected by the respective reflective surfaces 201, 201P of the first and second rear view mirrors 2, 2P.

The reflected radiation is at least partly directed in a rearward direction of the vehicle 1. More specifically, the reflected radiation is directed so as to have a component of its direction in the rearward direction of the vehicle 1. The reflection of the radio waves of the radiation, having a wavelength which is considerably longer than that of visible light, will spread in several directions, some of which is in the rearward direction of the vehicle 1.

With reference to FIG. 1 and FIG. 2, the location of the first antenna 4 in relation to the first rear view mirror 2 will be closer described. The third antenna 402 is similarly located in relation to the second rear view mirror 2P.

Herein a centre CR (FIG. 2) of the reflective surface 201 is defined as the centre of "surface mass" of the reflective surface. The coordinates for the centre of surface mass are defined by the average of the weighted position coordinates of the distributed surface. (For example, for a rectangle the centre of surface mass will of course be at the intersection of its diagonals.)

The first antenna 4 is located within vertical limits VLA, VLB (FIG. 1) above and below the reflective surface 201. These vertical limits VLA, VLB are defined by respective vertical distances from the centre CR of the reflective surface 201. Each such vertical distance is equal to the vertical extension VER of the reflective surface 201. I.e. the upper vertical limit VLA is located above the reflective surface 201 and at a vertical distance from the centre CR of the reflective surface 201 which is equal to the vertical extension VER of the reflective surface 201. Similarly, the lower vertical limit VLB is located below the reflective surface 201 and at a vertical distance from the centre CR of the reflective surface 201 which is equal to the vertical extension VER of the reflective surface 201. Preferably, the first antenna 4 is located within the limits of the vertical extension VER of the reflective surface 201.

As can be seen in FIG. 2, the first antenna 4 is further located rearwards of the centre CR of the reflective surface 201 of the first rear view mirror 2. Also, the first antenna 4 is located closer to a vehicle centre line CL than the centre CR of the reflective surface 201, and further away from the vehicle centre line CL than a backrest 501 of a driver's seat 5. There is an unobstructed line of sight between the first antenna 4 and the reflective surface 201.

Figure 6:
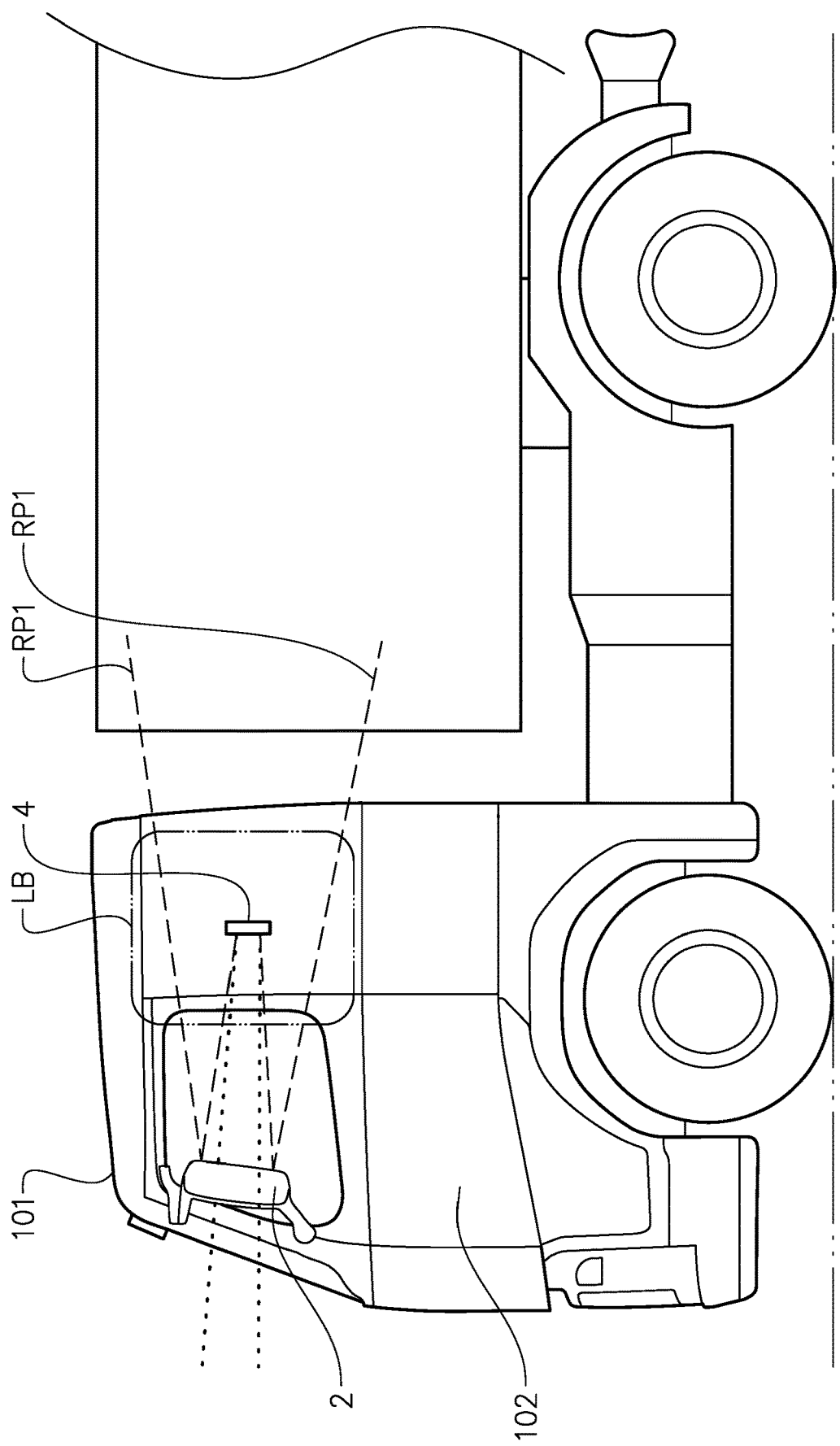
FIG. 6 shows a perspective view of the vehicle in FIG. 1.

FIG. 6 shows a rectangle LB defining particularly preferred boundaries of the first antenna 4 location on the side 102 of the cab 101. A position of the first antenna 4 as described above can provide for a substantial portion of the antenna radiation to be reflected from the reflective surface 201. As indicated in FIG. 6 by the broken lines R1, a portion of the first antenna radiation is reflected backwards from the reflective surface of the first rear view mirror 2. As indicated by the lines R2, another portion of the radiation is not reflected from the reflective surface of the first rear view mirror 2, and is directed in other directions, e.g. forward, and sideways. Thus, the first antenna 4 and the first rear view mirror 2 are arranged so that a part of the first antenna radiation is reflected by the reflective surface 201 and another part of the first antenna radiation is directed besides the reflective surface 201.

Figure 7:
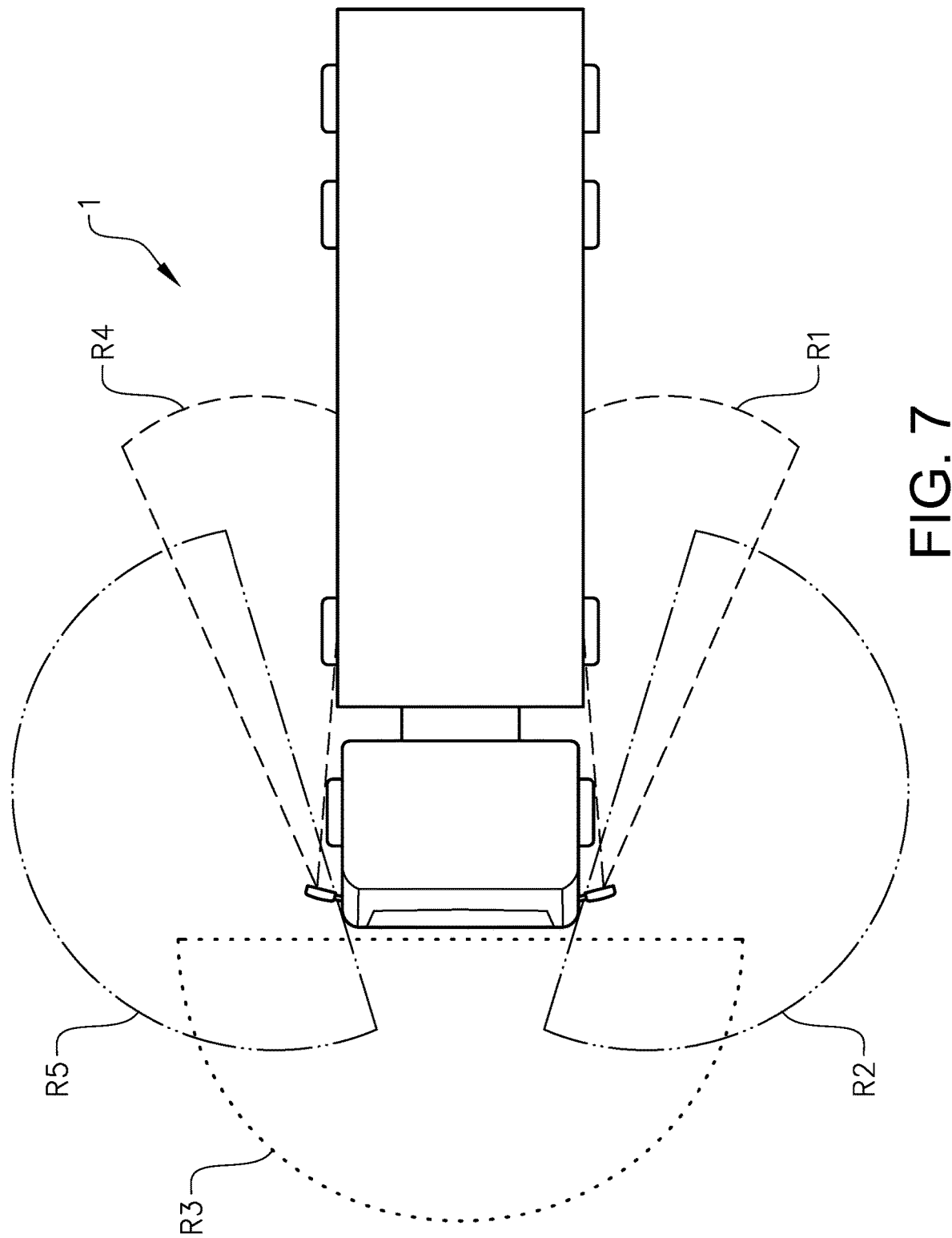
FIG. 7 shows a top view of the vehicle in FIG. 1 with a semitrailer.

FIG. 7 depicts from above the portion R1 of the first antenna radiation reflected by the reflective surface of the first rear view mirror 2, and the portion R2 of the first antenna radiation not reflected by the reflective surface of the first rear view mirror 2. FIG. 7 also depicts radiation R3 from the second antenna, mostly directed with a component in the forward direction of the vehicle 1. In addition a portion R4 of the third antenna radiation reflected by the reflective surface of the second rear view mirror 2P, and a portion R5 of the third antenna radiation not reflected by the reflective surface of the second rear view mirror 2P, are depicted in FIG. 7.

Preferably, the first and third antennas 4, 402 and the first and second rear view mirrors 2, 2P are arranged so that in a horizontal plane, the reflective surfaces 201, 201P extend over the respective antenna radiation sector of 10-40 degrees, preferably 20-30 degrees. Thereby, a substantial portion of the antenna radiation may be reflected by the reflective surfaces.

As stated, the antennas 4, 401, 402 have a non-zero directivity. The reflective surfaces are located in respective sectors of maximum radiation. More specifically, the reflective surfaces 201, 201P may be located within the respective antenna radiation sectors of 90 degrees which during transmission includes a radiation which is stronger than any radiation in an antenna radiation sector of the remaining 270 degrees. Preferably, the centre CR of the reflective surface 201 is located in line with the direction of the antenna radiation maximum; see also FIG. 5.

The first and third antennas 4, 402 are arranged so that during transmission the strongest radiation of the antennas 4, 402 is directed partly forward and partly sideways in relation to the vehicle 1. Thereby, a location of the antennas as described above in relation to the rear view mirrors 2, 2P will provide for a substantial portion of the radiation being reflected, while a further substantial portion of the radiation is directed forward and sideways in relation to the vehicle, e.g. as depicted in FIG. 7.

Reference is made to FIG. 2. The first and second rear view mirrors 2, 2P are adjustable to change the angular position of the respective reflective surfaces 201, 201P. More specifically, the reflective surfaces 201, 201P are mounted to the respective rear view mirror frames at respective joints 202, 202P. By the arrangement of the first and third antennas 4, 402 as described above, a substantial part of the radiation emitted by the antennas 4, 402 is reflected by the reflective surfaces 201, 201P and directed in a rearward direction of the vehicle, in any angular positions of the reflective surfaces 201, 201P. Also contributing to this advantage is that the reflected radio waves, having a relatively long wavelength, has a tendency to spread in several directions, some of which is the rearward direction of the vehicle, regardless of the angular positions of the reflective surfaces.

Figure 8:
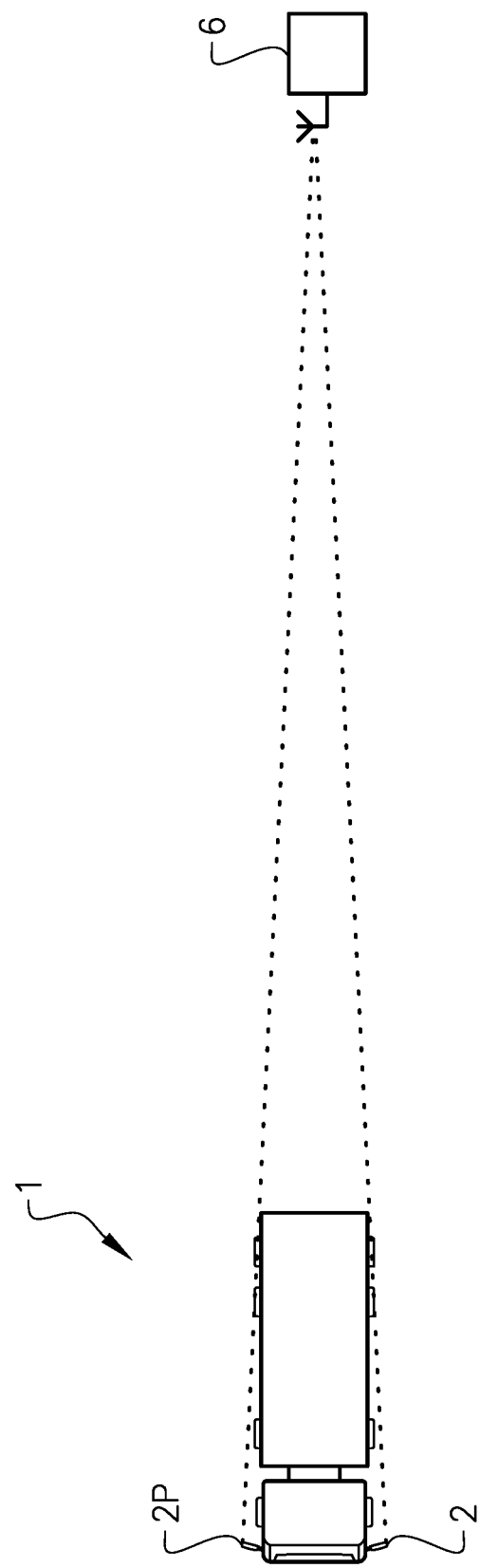
FIG. 8 shows a top view of the vehicle in FIG. 1 with a semitrailer, and of a radio receiver.

As illustrated in FIG. 8, embodiments of the invention may provide for radiation emitted by the antennas 4, 402, and reflected by the reflective surfaces 201, 201P of the rear view mirrors 2, 2P, reaching a receiver 6 in a position straight behind the vehicle 1. Since the reflective surfaces 201, 201P may extend sideways outwardly of the extension of the vehicle 1, radiation reflected by the reflective surfaces 201, 201P may reach such positions.

The invention claimed is:

1. A vehicle comprising a rear view mirror presenting a reflective surface arranged to provide a driver of the vehicle with a view in a rearward direction of the vehicle, and an antenna adapted to emit radiation for radio wave transmissions, wherein the antenna and the rear view mirror are arranged so that at least a part of the radiation emitted by the antenna is reflected by the reflective surface, wherein the antenna is located rearwards of a center of the reflective surface, rearwards being a rearward direction of the vehicle.

2. A vehicle according to claim 1, wherein the antenna and the rear view mirror are arranged so that the radiation reflected by the reflective surface is at least partly directed in a rearward direction of the vehicle.

3. A vehicle according to claim 1, wherein the rear view mirror is adjustable to change the angular position of the reflective surface, wherein the antenna and the rear view mirror are arranged so that, in any angular position of the reflective surface, the radiation reflected by the reflective surface is at least partly directed in a rearward direction of the vehicle.

4. A vehicle according to claim 1, wherein the vehicle comprises a transmitter which is connected to the antenna, wherein the transmitter, the antenna and the rear view mirror are arranged so that the transmissions of the antenna are for vehicle-to-vehicle communications and/or vehicle-to-infrastructure communications.

5. A vehicle according to claim 1, wherein the vehicle comprises a transmitter which is connected to the antenna, wherein the transmitter and the antenna are arranged so that the transmissions of the antenna have a carrier frequency of 5.8-6.0 GHz, preferably 5.855-5.925 GHz.

6. A vehicle according to claim 1, wherein the rear view mirror is mounted externally on the vehicle.

7. A vehicle according to claim 1, wherein the antenna mounted on a side of a cab or a body of the vehicle.

8. A vehicle according to claim 1, wherein the antenna is mounted on an external side of a limitation of the vehicle.

9. A vehicle according to claim 1, wherein there is an unobstructed line of sight between the antenna and the reflective surface.

10. A vehicle according to claim 1, wherein the antenna is located within vertical limits (VLA, VLB) above and below the reflective surface, which vertical limits (VLA, VLB) are defined by respective vertical distances from a centre (CR) of the reflective surface, each vertical distance being equal to the vertical extension (VER) of the reflective surface.

11. A vehicle according to claim 1, wherein the antenna is located within limits of a vertical extension (VER) of the reflective surface.

12. A vehicle according to claim 1, wherein the antenna located rearwards of a centre (CR) of the reflective surface and closer to a vehicle centre line (CL) than the centre (CR) of the reflective surface.

13. A vehicle according to claim 1, wherein the vehicle comprises a driver's seat with a backrest, and the reflective surface is located forward of the backrest and further away from a vehicle centre line (CL) than the backrest.

14. A vehicle according to claim 1, wherein the vehicle comprises a driver's seat with a backrest, and the antenna is located further away from a vehicle centre line (CL) than the backrest.

15. A vehicle according to claim 1, wherein the vehicle comprises a driver's seat with a backrest, the antenna is located rearwards of a centre (CR) of the reflective surface, and the antenna is located no further rearwards of the centre (CR) of the reflective surface than twice a distance, in a direction of straight travel of the vehicle, between the centre (CR) of the reflective surface and the backrest.

16. A vehicle according to claim 1, wherein the antenna and the rear view mirror are arranged so that in a horizontal plane, the reflective surface extends over an antenna radiation sector of 10-40 degrees, preferably 20-30 degrees.

17. A vehicle according to claim 1, wherein the antenna is arranged to present in a horizontal plane a non-zero directivity.

18. A vehicle according to claim 17, wherein the reflective surface is located within an antenna radiation sector of 90 degrees which during transmission includes a radiation which is stronger than any radiation in an antenna radiation sector of the remaining 270 degrees.

19. A vehicle according to claim 17, wherein the antenna is arranged so that during transmission the strongest radiation of the antenna is directed partly forward and partly sideways in relation to the vehicle.

20. A vehicle according to claim 1, wherein the antenna and the rear view mirror are arranged so that a part of the antenna radiation is reflected by the reflective surface and another part of the antenna radiation is directed besides the reflective surface.

21. A vehicle according to claim 1, wherein the antenna has a beam width of approximately 180 degrees.

22. A vehicle according to claim 1, wherein the antenna a dipole antenna.

23. A vehicle according to claim 1, wherein the antenna is an omnidirectional antenna.

24. A vehicle according to claim 1, wherein the antenna is a first antenna, the vehicle comprising at least one additional antenna, the first antenna and the at least one additional antenna form together an antenna cluster, in which the first antenna and the at least one additional antenna are arranged to cooperate and to send and receive the same radio signal information.

25. A vehicle according to claim 1, wherein the antenna is a first antenna, the first antenna and the rear view mirror being arranged so that during a transmission the radiation reflected by the reflective surface is at least partly directed in a rearward direction of the vehicle, the vehicle comprising a second antenna arranged to direct radiation of the transmission mainly in a forward direction of the vehicle.

26. A vehicle according to claim 1, wherein the rear view mirror is located on a driver's side of the vehicle, the vehicle comprising a further rear view mirror located on a passenger's side of the vehicle, the further rear view mirror presenting a further reflective surface arranged to provide the driver of the vehicle with a view in a rearward direction of the vehicle, the vehicle further comprising a further antenna for the radio wave transmissions, the further antenna being arranged so that at least a part of the radiation emitted by the further antenna is reflected by the further reflective surface.

27. A use of an antenna adapted to emit radiation for radio wave transmissions and a rear view mirror of a vehicle, presenting a reflective surface arranged to provide a driver of the vehicle with a view in a rearward direction of the vehicle, characterized by arranging the antenna so that at least a part of the radiation emitted by the antenna is reflected by the reflective surface, wherein the antenna is located rearwards of a center of the reflective surface, rearwards being a rearward direction of the vehicle such that at least part of the radiation emitted by the antenna is reflected in the rearward direction.

28. A use according to claim 27, wherein by arranging the antenna so that the radiation reflected by the reflective surface is at least partly directed in rearward direction of the vehicle.

29. A use according to claim 27, where the rear view mirror is adjustable to change the angular position of the reflective surface, characterized by arranging the antenna so that, in any angular position of the reflective surface, the radiation reflected by the reflective surface is at least partly directed in a rearward direction of the vehicle.

30. A use according to claim 27, wherein by connecting the antenna to a transmitter and using the antenna for transmissions in vehicle-to-vehicle communications and/or vehicle-to-infrastructure communications in which at least a part of the radiation emitted by the antenna is reflected by the reflective surface.

31. A use according to claim 27, wherein by connecting the antenna to a transmitter and using the antenna for transmissions having a carrier frequency of 5.8-6.0 GHz, preferably 5.855-5.925 GHz, in which at least a part of the radiation emitted by the antenna is reflected by the reflective surface.

32. A use according to claim 27, wherein by mounting the antenna on a side of a cab or a body of the vehicle.

33. A use according to claim 27, wherein by mounting the antenna on an external side of a limitation of the vehicle.

34. A use according to claim 27, wherein by arranging the antenna so that there is an unobstructed line of sight between the antenna and the reflective surface.

35. A use according to claim 27, wherein by arranging the antenna to present in a horizontal plane a non-zero directivity.

36. A use according to claim 27, wherein by the antenna being a dipole antenna.

37. A use according to claim 27, wherein in that the antenna is an omnidirectional antenna.

* * * * *